April 14, 1925.  
R. E. CARROLL  
SQUARE CORNER GLUE JOINT  
Filed July 14, 1924
1,533,099
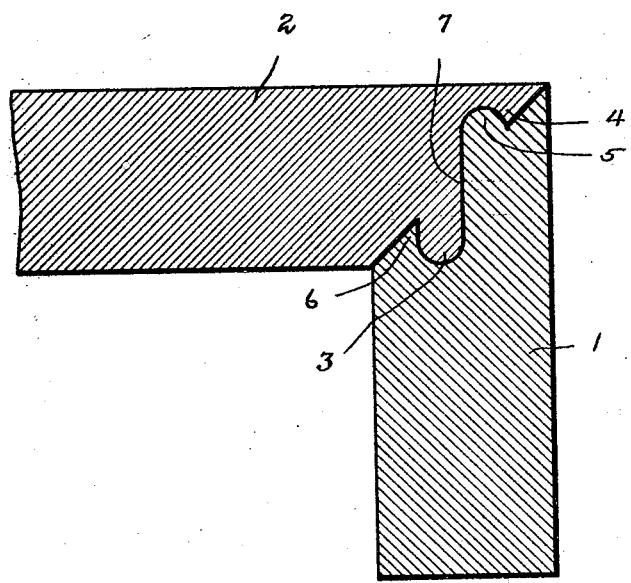
Inventor  
ROB'T. E. CARROLL  
By Geo Stevens.  
Attorney Patented Apr. 14, 1925.

1,533,099

UNITED STATES PATENT OFFICE.

ROBERT E. CARROLL, OF DULUTH, MINNESOTA.

SQUARE-CORNER GLUE JOINT.

Application filed July 14, 1924. Serial No. 725,842.

*To all whom it may concern:*

Be it known that I, ROBERT E. CARROLL, a citizen of the United States, residing at Duluth, in the county of St. Louis and State of Minnesota, have invented certain new and useful Improvements in Square-Corner Glue Joints, of which the following is a specification, reference being had therein to the accompanying drawing.

This invention relates to carpentry and particularly to an improved form of interlocking joint especially adapted for use in a right angle corner in the manufacture of square columns, newel posts, or the like, The principal object is to produce a more substantial and durable joint of this character than heretofore known.

Other objects and advantages will appear in the further description of the invention.

In the accompanying drawing, forming part of this application, and in which like reference characters indicate like parts:

The illustration represents a sectional view through one corner of a fabricated square column or post, assembled in accordance with my improved joint.

1 represents one side of the column and 2 one contiguous side. The joint, generally speaking, is that of a miter, the mitered face of each side having formed thereon a semi-circularly shaped bead and a V-shaped bead, the latter of each piece forming a back or shoulder for the semi-circularly shaped bead of the opposite side member.

The semi-circularly shaped bead on the side piece 2 is shown at 3 and the V-shaped bead on the same side is shown at 4, while the semi-circularly shaped bead on the side piece 1 is shown at 5 and the V-shaped bead on the same piece is shown at 6; such constructions resulting in a comparatively long straight flat joining area 7 which is parallel with the sides of one of the side pieces.

It is apparent that a column when being constructed with corners embodying this invention will only have to be held together for gluing purposes from two opposite sides such sides being those upon which the straight flat surface 7 is at right angles to the side wall thereof, thus avoiding the necessity of clamps wholly about the column.

Having thus described my invention, what I claim and desire to secure by Letters Patent, is:

A miter joint comprising two minor straight flat surfaces one at either extremity of the miter, and a larger straight flat surface diagonally disposed in respect to the first mentioned surfaces, and semicircularly shaped surfaces intermediate of the flat straight surfaces, said joint being separable only in a direction parallel to one of the members and at right angles to the other member.

In testimony whereof I hereunto affix my signature in the presence of two witnesses.

ROBERT E. CARROLL.

Witnesses:
S. C. BRONSON,
S. GEO. STEVENS.